United States Patent [19]

Schuessler et al.

[11] Patent Number: 4,922,254

[45] Date of Patent: May 1, 1990

[54] TOPOGRAPHIC MAPPING

[75] Inventors: Harald Schuessler, Daisendorf; Oswald Bender, Friedrichshafen, both of Fed. Rep. of Germany

[73] Assignee: Dornier System GmbH, Friedrichshafen, Fed. Rep. of Germany

[21] Appl. No.: 180,209

[22] Filed: Apr. 11, 1988

[30] Foreign Application Priority Data

Apr. 9, 1987 [DE] Fed. Rep. of Germany ....... 3712065

[51] Int. Cl.$^5$ ............................................. G01S 13/90
[52] U.S. Cl. ......................................... 342/25; 342/78
[58] Field of Search ................... 342/25, 78, 74, 191

[56] References Cited

U.S. PATENT DOCUMENTS

| | | | |
|---|---|---|---|
| 4,280,127 | 7/1981 | Lee et al. | 342/25 |
| 4,321,601 | 3/1982 | Richman | 342/25 |
| 4,551,724 | 11/1985 | Goldstein et al. | 342/25 |
| 4,611,208 | 9/1986 | Kane et al. | 342/25 |

Primary Examiner—Thomas H. Tarcza
Assistant Examiner—Mark Hellner
Attorney, Agent, or Firm—Ralf H. Siegemund

[57] ABSTRACT

The present invention relates to a method for topographically mapping the surface of the Earth under utilization of measuring the altitude by means of radar, and under further utilization of a synthetic aperture for the radar, as well as an electronically controlled antenna lobe. In accordance with the preferred embodiment of the present invention, it is suggested to conically pivot the antenna lobe around a nadir, whereby pivoting of the center line follows a path such that the line constitutes the geneatrix of a cone.

7 Claims, 3 Drawing Sheets

SCHEME

TOPOGRAPHIC MAPPING

BACKGROUND OF THE INVENTION

The present invention relates to a method for topographically mapping the surface of the eartH under utilization of measuring the altitude by means of radar, and under further utilization of a synthetic aperture for the radar, as well as an electronically controlled antenna lobe.

Topographically mapping the surface of the earth by means of scanning, under further utilization of radargrammetry, while using satellite carried microwave sensors, is a technology which is just in its infancy stages. An impressive example for the potential power of such sensor systems was demonstrated by the Jet Propulsion Laboratory in Pasadena, Calif. Here, it was shown that through stereoscopic evaluation of respective two sequences of images, one could provide a narrow grid, digital altitude model of Mt. Shasta in Northern California. These images were provided by the shuttle imaging radar SIR-B program and resulted from several orbits. The results of this operation were published by F. W. Leberl et al, under the heading of "Radar Stereo Mapping Techniques and Application to SIR-B Images of Mt. Shasta", in IEEE Transaction Geoscience and Remote Sensing, Vol. GE 24, No. 4, of July 1986.

Several methods for areal coverage of radar altitude measurements were published in "Microwave Remote Sensing", Vol. 2, by F. T. Ulaby, R. K. Moore, and A. E. Fung. In this latter publication, the principle of generating a synthetic aperture of a radar beam (SAR) plays an important part, because this method requires a high areal resolution for a narrow grid altitude model which is equally applicable for measurements from outer space. Topographic methods, through evaluation of the parallactic effect, is made possible owing to the effect that results from two SAR images, taken from different orbital paths. Radar stereo mapping techniques and applications to SIR-B images of Mt. Shasta describe limited areal coverage and extremely expensive data acquisition. Therefore, this method is not really of great interest for world-wide topographic mapping.

A side-view radar, based on interferometry with a synthetic aperture, provides the desired topographic data directly from the measured angles of deflection and displacement of the image elements. An SAR system is described in "Microwave Remote Sensing" which requires two antennas and two image processors with relatively complex data channels related to amplitude and phase processing. The altitude measurements, however, exhibit ambiguities owing to the phase difference which results from integral multiple of +— pie. In order to obtain digital models of altitude, one will normally require only a moderate areal resolution such as 250 m by 250 m. On the other hand, the altitude resolution should be in the meter range (at the most). Here then, one can think of the classical principle of radar altitude measurements wherein the areal resolution is the result of the real or of a synthetic antenna aperture, while the altitude resolution results from short pulsing. However, this method is practical only for very steep angles of incidence, and the antenna lobe has to be pivoted in a suitable manner so that, indeed, one obtains sufficiently wide strips parallel to the foot path of the space vehicle.

A method has been devised by the Jet Propulsion Laboratory and described in "A Scanning Radar Altimeter for Mapping Continental Topography", by T. H. Dixon, Jet Propulsion Publication 86-26, 2nd Spaceborne Imaging Radar Symposium, JPL April 1986. This method involves a side-view radar with synthetic aperture wherein the antenna lobe is electronically pivoted transversely to the direction of flight. The Nadir is excluded here only to an extremely strong back scatter of the radar signal.

DESCRIPTION OF THE INVENTION

It is an object of the present invention to provide topographic altitude measurments possibly for covering a large portion of the earth surface, with the principal goal in mind of covering the earth in its entirety, with a minimal expenditure in effort and time, whereby the altitude information is the result of determining the center of gravity of the power profile of a radar echo, obtained through an electronically controlled antenna lobe, and from areas around the satellite ground path under utilization of a synthetic aperture for the radar equipment.

In accordance with the preferred embodiment of the present invention, it is suggested to conically pivot the antenna lobe around a Nadir, whereby pivoting of the center line follows a path such that the line constitutes the geneatrix of a cone. This will be referred to hereafter as conical scanning, pivoting or deflection. Conical pivoting obtains through orthogenal phase control such that the entire propagation time of a radar pulse for search and echo remains approximately constant, and that the average topographic altitude is determined within a resolution cell reference to the center of gravity of the echo power profile.

The invention offers the advantage that through a group radiator with electronic diagram control in two main planes, one obtains a conical pivoting of an antenna lobe around a Nadir such that, indeed, the entire transit time of pulse and echo remain approximately constant. The area of unambigious altitude measurement is, therefore, subject to maximization without requiring any special antanna for receiving. This means that one no longer has to cope with decoupling problems owing to a second antenna. The entire surface of the earth can be topographically measured under a minimal time requirement. Owing to the required global acquisition of altitude information, the method can be used only in conjunction with an orbital system as provided by a satellite or the space shuttle, or the like. The utilization of radar sensors is, for more practical purposes, to be considered ideal, owing to a use which is, in fact, not interfered with by climate or weather.

The pivoting of the antenna lobe also permits a utilization of a constant pulse raster and the reflecting area of the surface of the earth is within the receiving window. The digital processing produces one topographically relevant altitude value per resolution cell. All altitude values, so-called topographic Pixels, are transformed into an earth bound coordinate system. The conventional altitude measurement is, in fact, improved, owing to the utilization of the center of gravity of the echo power profile by operation of a microwave sensor that is being conically pivoted in and round the Nadir, as far as the antenna lobe is concerned.

DESCRIPTION OF THE DRAWINGS

While the specification concludes with claims particularly pointing out and distinctly claiming the subject matter which is regarded as the invention, it is believed that the invention, the objects and features of the invention, and further objects, features, and advantages thereof will be better understood from the following description taken in connection with the accompanying drawings in which:

Proceeding now to the detailed description of the drawings, FIG. 1 illustrates an areal, normal of a planar group radiator with dimensions $a_x \times a_y$ facing the Nadir. The center c of radiation of the antenna lobe, is electronically pivoted by oscillatory movement in two main orthogonal planes. The center beam is generating a conical surface, with half an apex angle alpha. The radiation ellipse has a long axis $L_o$ and a small or short axis delta x. The short axis delta x determines the geometric resolution transverse to the direction of flight. Owing to the particular antenna orientation, the two direction of the axes remain invariant in the entire pivot system.

The image strip is fully illuminated through the conical pivoting of the lobe. The coverage is thus complete and the measuring sequence for $N_y$ cells in the direction of flight within the radiation ellipse has to be completed in the time given by $N_y$ multiplied by delta y/v, where v is the speed of the craft above ground. The geometric revolution in the direction of flight is carried out in accordance with the SAR principle under consideration of the integration period and the Doppler gradient. The terrain altitude is determined through transit time measurements, and one can see that the altitude cells are obliquely stacked around the constant angle alpha vis-a-vis the vertical.

This measuring principle promises a number of advantages. First of all, the angle of inclination alpha is and remains constant and is, in fact, smaller than in the case of conventional lateral view or side view radar, covering the same strip width. The reason for this is that the Nadir strip, in accordance with the present invention, does not have to be excluded. In the case of an altitude above ground of about 250 km, and for covering a 100 km wide strip, one needs only an angle of inclination of about 11°. Owing to the constant angle of incidence, deviations in the echo power are minimized. Particularly, the strong Nadir echo is avoided entirely. The minimal angle of inclination, moreover, permits small antenna length $a_x$ for the given geometric resolution delta x. Finally, it should be mentioned that echoes from the same altitude level and within the aforementioned strip produce similar transit times. This, in turn, means that very effective scanning schemes can be used in conjunction with periodically repeated pulse sequences.

Figure 2:
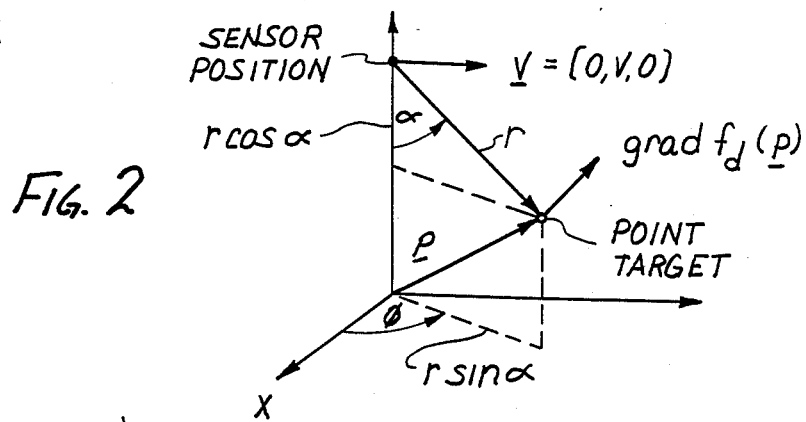
FIG. 2 is a vector diagram for a Doppler gradiant field.

The Doppler resolution depends on the Doppler gradient field within the altitude cells. The diagram shown in FIG. 2 illustrates the geometric relations of the respective vectors.

A vector $p = [p_x, p_y, p_z]$ produces a Doppler shift of the echo with a wavelength lamda 0, given by $$f_d(p) = \frac{2v_r}{\lambda_o} = \frac{2}{\lambda_o r}(v \cdot r) \tag{1}$$

Owing to $\vec{p} = \vec{r} + \vec{H}e_z$ and $\vec{v} \cdot \vec{e}_z = 0$ follows $$f_d(p) = 2vp_y/(\lambda_o r) \tag{2}$$

under utilization of $$r = (p_x^2 + p_y^2 + p_z^2 - 2p_zH + H^2)^{\frac{1}{2}} \tag{3}$$

Points with a constant oblique distance r are identified by a vector p being equal to
[r sin alpha cos teta, r sin alpha, sin teta, H-r cos alpha].

The scalar Doppler field has the gradient $$\text{grad} f_d = \left[ \frac{\delta f_d}{\delta p_x}, \frac{\delta f_d}{\delta p_y}, \frac{\delta f_d}{\delta p_z} \right]$$

$$\text{grad} f_d = \frac{2v}{\lambda_o r}[-\sin^2\alpha \sin\phi \cos\phi, 1 - \sin^2\alpha \sin^2\phi, \sin\alpha \cos\alpha \sin\phi]$$

Owing to the fact that vector $r \cdot \text{grad } f_d = 0$, the Doppler gradient is perpendicular to the distance vector r. Hence, that vector is positioned tangentially to the respective altitude cell as desired. Its quantity is given by $$\frac{2v}{\lambda_o r} \text{ fur } \phi = 0 \tag{5}$$

$$|\text{grad} f_d| = \frac{2v}{\lambda_o r} \cos\alpha \text{ fur} \phi = \pi/2$$

The Doppler gradient is oriented essentially in the direction of flight $\vec{e}_y$ so that, in accordance with equation 4, the turning angle is given by $$\epsilon \approx (-\sin^2 \alpha \sin \phi \cos \phi)/(1 - \sin^2 \alpha \sin^2 \phi) \tag{6}$$

in the x, y plane for all pivot angles $$0 \leq \phi \leq \pi$$

which remains under 1° for an angle of inclination of alpha about 10°. Owing to the rotation of the earth, one causes an additional turning of the Doppler gradient of not more than 4°. This deviation, too, can be neglected for the particular case but, if desired, one could compensate it owing to a particular yaw angle control of the vehicle and of the antanna, being coupled thereto.

The geometric resolution delta y in the direction of flight is carried through Doppler filtering in accordance with the SAR principle for purposes of the illumination ellipse within the scanning strip. Since each cell A has a resolution of delta x times delta y, as will be shown more fully below, one needs several different independent observations ($N_l$) in order to subdivide this resolution cell into a partial cell of a dimension delta x times delta y divided by $N_l$. The period of time necessary for a coherent integration is given by $$T_{int} \approx (|\text{grad } f_d| \Delta y/N_L)^{-1} \tag{8}$$

Figure 1:
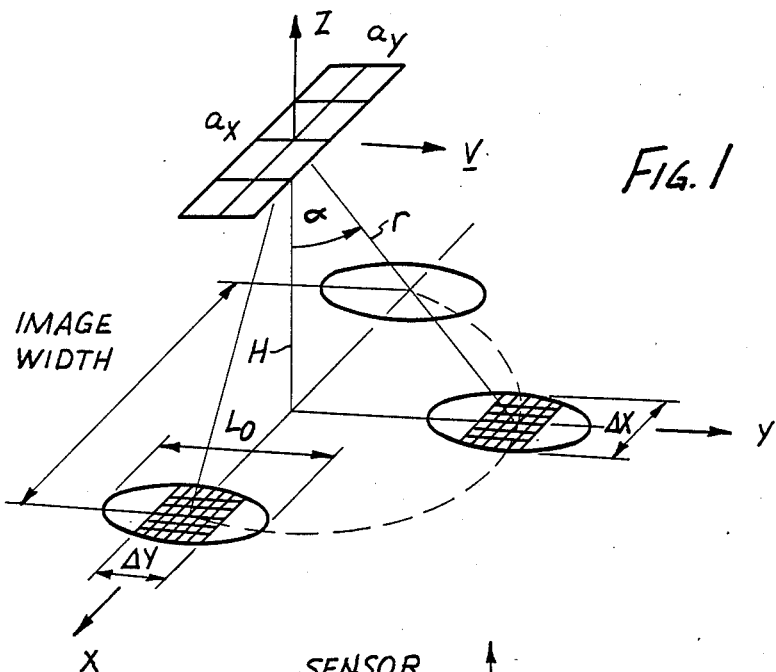
FIG. 1 illustrates in principle a radar antenna with conical pivoting of its lobe in accordance with the preferred embodiment of the present invention for practicing the best mode thereof.
Figure 3:
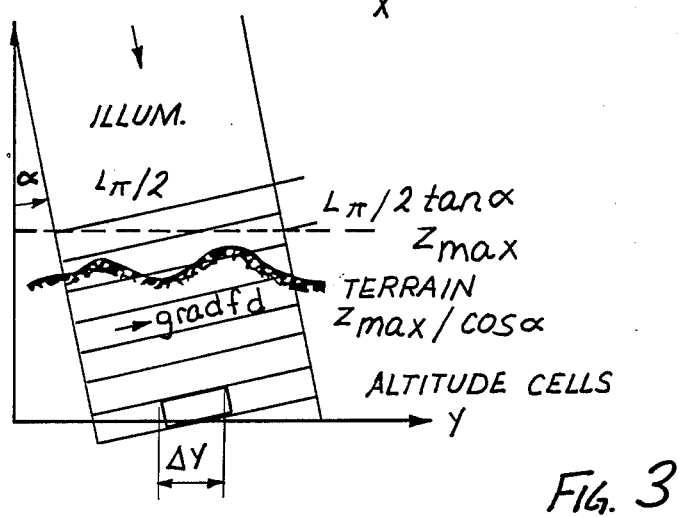
FIG. 3 illustrates the cell geometry for pivoting of pi/2 at an altitude resolution delta r.

The long axis $L_0$ of the illumination ellipse, shown in FIG. 1, is defined for a pivot angle of phi=0. For phi=-pi/2 at a fixed antenna width $a_y$, one obtains $$L_{\pi/2} = L_o/\cos \alpha, \text{ wobei} \tag{9}$$

whereby a measurement obtains vertically to the stacking of the altitude cells. The geometric relations for the illumination ellipse is now shown in greater detail in FIG. 3, particularly with regard to the y axis.

The terrain has to have an altitude interval of $z_{max}$. It is illuminated through a short, carrier-wave modulated pulses of a duration $T_p$. These signals are transmitted as chirp signals, and are expanded by the factor $r_{ex}$. The maximum echo duration was then given by $$T_{echo} = \frac{2}{c_o \cos\alpha}(L_o \tan\alpha + z_{max}) + T_p r_{ex} \tag{10}$$

mit $T_p = 2 \Delta r/c_o$ wherein $c_0$ is the propagation speed of the electromagnetic waves in vacuum. The pulses are transmitted periodically with a pulse spacing $T_s$. The echoes are received in the respective gaps in-between, whereby the antenna lobe is correspondingly pivoted. The switchover is completed within another time period $T_g$, and the pulsating interval $T_s$ has, therefore, to be larger than a different relation;

$$T_s \geq T_p r_{ex} + 2T_g + T_{echo} \tag{11}$$

The puls rate $1/T_s$ is chosen so that the echoes will certainly be received within the gaps between transmitted pulses. This can always be made possible owing to the conical pivoting and the uniform height or elevational interval $z_{max}$, for a given measuring sequence. The equations (10) and (11) above determine the system on account of the relation, delta x smaller than $L_0$.

The geometric resolution in the direction of flight requires that each cell within the scanning interval T has to be illuminated for the duration $T_{int}$. In order to avoid spectral overfolding, the scanning array has to be larger than the Doppler band width of the echoes. Usually, one employs for such a case a 20% reserve. The average Doppler shift is known. That shift is quite different for echoes from different areas, but has to be eliminated. Also, it has to be considered that the revolution cell may traverse several altitude levels. For the chosen geometry the Doppler band width of the echoes received is determined in accordance with equation (5) above $$T^{-1} = 2,4 L_o v/(\lambda_o r)$$

$$\Delta f_d = L|\text{grad } f_d| = 2L_o v/(\lambda_o r) \tag{12}$$

This requires a scanning rate of $T^{-1}$. The coherent integration period is given by $$T_{int} = \frac{\lambda_o r \, N_L}{2v \, \Delta y} \tag{13}$$

Suppose one wishes to form $N_y$ resolution cells of the size A in the direction of flight, and suppose one considers only the pitch angle error sigma x of the antenna, then the large axes $L_o$ of the illumination field has to be larger than as per $$L_o \geq N_y \Delta y + 2\sigma_x H \tag{14}$$

Figure 4:
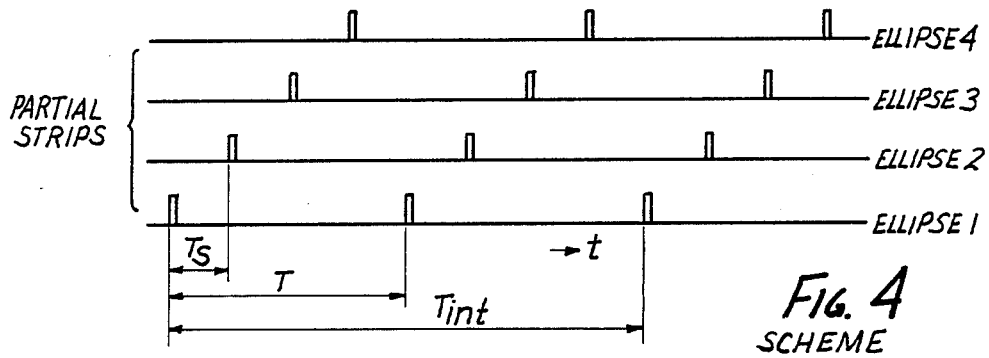
FIG. 4 is a pulse and signal diagram for explaining the scanning scheme of the preferred embodiment.

Since the clock frequency $1/T_s$ is usually far above the scanning rate $1/T$, several cells, i.e. an entire partial strip, can and should be illuminated during the requisite integration period $T_{int}$, because that period is much larger than T, and through a suitable lobe pivoting this coverage readily obtains. FIG. 4 illustrates this particular kind of scanning scheme. Assuming for the measuring sequence, there remains a period $$N_y \Delta y/v < T_{int} + T, \tag{15}$$

Accordingly, then one may cover as many partial strips. The width S of the image strips is then given by $$S \approx \frac{T N_y \Delta x \Delta y}{T_S (T_{int} + T) v} \doteq 2H \tan\alpha \tag{16}$$

This width value should be matched to orbital altitude and angle of inclination. Strictly speaking, only integral multiple of the quotions $T/T_s$ and of $$N_y \Delta y/[v(T_{int}+T)] \tag{17}$$

can be used

For measuring the altitude within a digital terrain model, one can define the average height of a terrain level z (x, y) at a cell resolution value of A=delta x times delta y, for a parallelepiped h times delta x times delta y and having the same volume so that the equation obtains $$h \, \Delta x \, \Delta y = \int_{(A)} z(x, y) \, dA. \tag{18}$$

Figure 5:
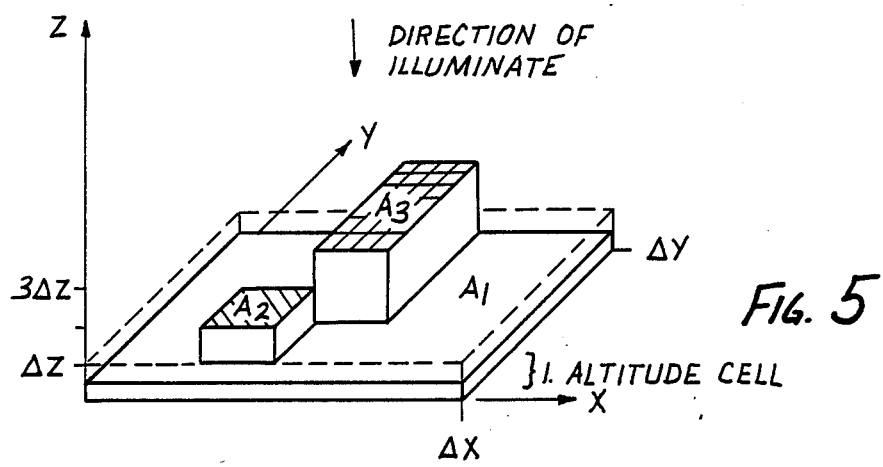
FIG. 5 is a digital altitude model with a step width of delta z for a resolution cell of delta x times delta y.

Now, FIG. 5 illustrates a digital altitude model for the resolution cell and a rather narrow grid, under utilization of an altitude quantization of delta z, the average altitude is given by $$h = \frac{1}{\Delta x \Delta y} \sum_{(k)} k \, \Delta z \, A_k = \left(\sum_{(k)} k \, \Delta z \, A_k\right) / \left(\sum_{(k)} A_k\right) \tag{19}$$

For vertical radar illumination of the resolution cell A, as defined above, and for a uniform back scatter coefficient sigma 0, then the power $P_k$ proportional sigma 0 $A_k$ is received from the kth altitude cell. From the equation (9) above it follows directly $$h = \Delta z \left( \sum_{(k)} k\, P_k \right) / \left( \sum_{(k)} P_k \right) \quad (20)$$

This means, the average altitude, in fact, corresponds to the center of gravity of the power distribution pattern and profile of the radar echo. Measuring errors are caused in this simple terrain model by the quantization of the altitude, as well as by inaccuracies in the power determination, as well as by deviations of the back scatter coefficient $\sigma°_k$ from an assumed constant value.

The following error evaluation is carried out for a particular terrain contour, defined to be encompassed by N altitude cells. Each cell is assumed to have the same re-radiation surface $A_k = A/N$. The partial surfaces $A_k$ may, indeed include non-coherent areal portions within the same altitude cell and level. The determination is carried out, as mentioned earlier, through a certain defective power determination operation.

All of the measured partial surfaces $\widetilde{A}_k = \overline{A}_k + \text{delta } A_k$ are independent, random variables, with an average value of $mu = A/N$ and a standard deviation sigma $=c$ times mu. The proportionality constant c will be determined later.

The entire or total altitude h is then given by $$h = \Delta z \frac{\sum_{k=1}^{N} k\, \widetilde{A_k}}{\sum_{k=1}^{N} A_k} = \Delta z \frac{(N+1)/2 + \sum_{k=1}^{N} k \Delta A_k / A}{1 + \sum_{k=1}^{N} \Delta A_k / A} \quad (21)$$

For small deviations delta$\widetilde{A_k}$, one can restate this as approximately $$\widetilde{h} = \Delta z \left[ \frac{N+1}{2} + \frac{1}{A} \sum_{k=1}^{N} k\, \Delta \widetilde{A_k} \right] \left[ 1 - \frac{1}{A} \sum_{k=1}^{N} \Delta \widetilde{A_k} \right] \quad (22)$$

With an average value of $\mu_h = \Delta z\,(N+1)/2$.

$$\widetilde{h} = \Delta z \left[ \frac{N+1}{2} + \frac{1}{A} \sum_{k=1}^{N} \left( k - \frac{N+1}{2} \right) \Delta \widetilde{A_k} \right] \quad (23)$$

the variance sigma$_h^2$ is then given by $$\delta_h^2 = \left( \frac{\Delta z}{A} \right)^2 \delta^2 \sum_{k=1}^{N} \left( k - \frac{N+1}{2} \right)^2 = \Delta z^2\, c^2\, N/12 \quad (24)$$

In one considers the altitude quantization error delta z divided by 12 in a computation of variance, then one obtains $$\delta_h^2 \simeq \Delta z^2 (1 + c^2 N)/12 \quad (25)$$

The measuring error with regard to echo power $$p_k \sigma°\, A_k \quad (26)$$

will then be caused essentially by image noise that is typical for the imaging microwaves.

The statistics of a dielectric echo power, satisfies approximately an exponential distribution. In accordance with "Microwave Remote Sensing", Vol. II, F. T. Ulaby, R. K. Moore and A. K. Fung. This is given by $$\delta_{pk} = \mu_{pk} \quad (27)$$

It may be assumed that $N_L$ independent power measurements are used for averaging. This is carried out through individual measurements of $N_L$ adjacent partial areas, and subsequent superimposing of the measuring value, corresponding to the desired resolution cell A = delta x times delta y. Under such conditions one obtains $$\sigma_{pk} = \mu_{pk}(1 + 1/\text{SNR})/N_L^{\frac{1}{2}} \quad (28)$$

This considers the signal to noise ratio SNR on the basis of additive thermal noise operation.

If the back scatter coefficient signal 0 is uniform with $P_i \sim A_k$, then the proportionality factor c will be, in this case, determine to be $$c = (1 + 1/\text{SNR})/N_L^{\frac{1}{2}} \quad (29)$$

If $N_L$, being the number of independent observations, increases indefinitely, one can readily see that the only residual error is that given by the altitude quantization.

Above we assumed a uniformed back scatter coefficient sigma 0 ($\sigma_o$) within a particular resolution cell. This is, of course, a simplifying assumption and quite unrealistic. In accordance with microwave remote sensing, one has to take into consideration that the back scatter coefficient may vary over 10 dB or even more.

The foregoing requires us to evaluate how the back scatter variations interfer with the accuracy of altitude measurements. For this we assume a perfect para-measurement. Random variables $A_k$ are then determined by $$\widetilde{A_k} = c_1 10^{-(\widetilde{\sigma°_k}/10)} = g(\widetilde{\sigma°_k}). \quad (30)$$

The average value mu and the standard deviation sigma of the random variable $A_k$ can be determined in accordance with "Probability, Random Variables, and Stochastic Processes", by A. Papoulis $$\mu \simeq g/\mu_{\sigma°}) + g''(\mu\sigma°_k)\sigma^2_{\sigma°_k}/2;\ \sigma \simeq 1\ g'(\mu_{\sigma°_k}/\sigma_{\sigma°_k} \quad (31)$$

Since $$\frac{d^{(mk)} g(\widetilde{\delta°_k})}{d\widetilde{\delta°_k}^m} = \left( -\frac{\ln 10^k}{10} \right)^m g(\widetilde{\delta°_k}) \quad (32)$$

one obtains for the proportionality constant c $$c = \sigma/\mu \simeq [1/(0.23\sigma_{\sigma°_k}) + 0.23\sigma_{\sigma°_k}/2]^{-1} \quad (33)$$

As expected, the proportionality constant c, in this case, depends only on the standard deviation sigma sigma$_{0k}$ of the back scatter coefficient.

$$\delta_{\delta°_k}$$

Figure 6:
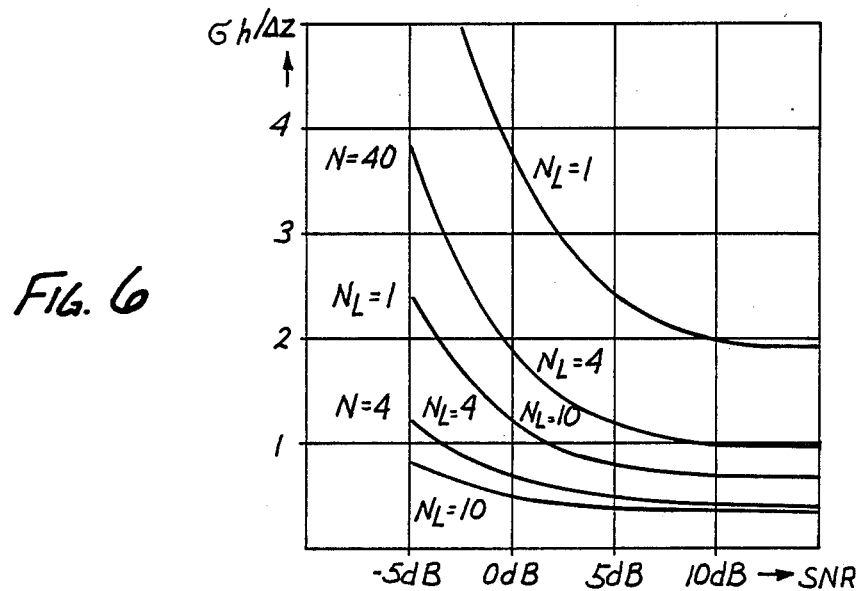
FIG. 6 demonstrates an altitude measuring error sigma h with reference to the altitude resolution delta z, as a function of the thermal signal-to-noise level distance Snr for Nl independent observations, and including flat terrain (N=4) and highly contoured terrain (N=40)
Figure 7:
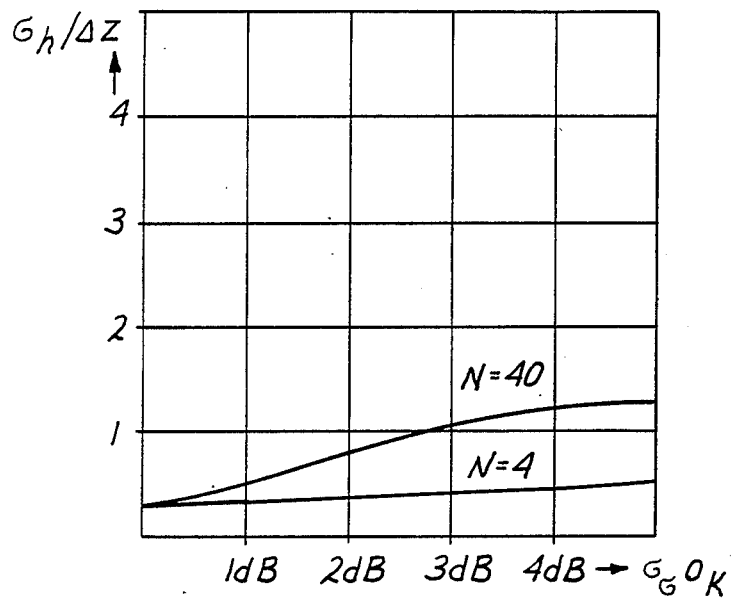
FIG. 7 illustrates the altitude measuring error sigma h/delta z, as a function of a standard deviation sigma sigma k0 of the back scatter coefficient for the two kinds of terrains.

FIGS. 6 and 7 illustrate a numerical evaluation of the equation (25), (29), and (33) above. Two cases are, again, to be distinguished. Flat terrain with (N=4) and deep terrain (N=40). For an altitude resolution of about 3 m, then the 40 altitude cells cover an areal depths of about 120 m. For a resolution cell with a grid of 100 m×250 m, these cell dimensions are, probably, the upper limit. The diagram of FIG. 6 shows that $N_L$ is of significant importance. If one assumes a standard deviation of the back scatter coefficient of about 3 dB, then a measuring system can be recommended with $N_L=4$ independently observation, for a signal to noise ratio of about 5 dB. In the case of a deep terrain (N=40), then one can expect a relative altitude measuring error of $\sigma_n/\Delta z \approx 1.6$ A computer simulation ratifies this assumption.

In the following, a particular example is described, complemented by tables and certain assumptions, as well as geometric data and signal parameters.

It is assumed that a synthetic aperture radar configuration is used for conical lobe pivoting, in order to obtain topographic mapping within the frame of a mission, as carried out, for example, by the space shuttle. The grid width delta x=delta y should be about 250 m, the altitude resolution delta r should be about 3 m. Within each illumination ellipse in direction of flight two cells will be resolved. The altitude of the orbit is assumed to be 250 km. Quite comparable with "A Scanning Radar Altimeter for Mapping Continential Topography", one assumes a carrier frequency of 37 GHz. This frequency constitutes a good compromise as between the antenna dimensions, on one hand, and the atmospheric extinction as well as the technological level of electronic components, on the other hand. All these parameters have been chosen, as shown in Table 1. The resulting radar parameters are then calculated in accordance with a theory given above, and are shown in Table 2. In other words, Table 2 constitutes an immediate and a direct example for practicing the present invention.

TABLE 1

| CONDITIONS | | |
|---|---|---|
| Label | Symbol | Quantity |
| Grid Width | $\Delta x, \Delta y$ | 250 m |
| Altitude Resolution | $\Delta r$ | 3 m |
| Orbital Height | H | 250 km |
| Angle of Inclination | alpha | 11.1° |
| Altitude Interval | $z_{max}$ | 1000 m |
| Number of cells | $N_y$ | 2 |
| Independent Observation | $N_L$ | 4 |
| Pitch Angle Error | $sigma_x$ | 0.03° |
| Carrier | $c_0/lambda_0$ | 37 GHz |
| Switch Over Period | $T_g$ | 0.25 μs |
| Pulse Expansion | $r_{ex}$ | 50 |

TABLE 2

| GEOMETRY AND PARAMETERS OF A DESIGN EXAMPLE | | |
|---|---|---|
| Label | Symbol | Quantity |
| Orbital Speed | v | 7755 m/s |
| Long Axis | $L_0$ | 762 m |
| Integration Period | $T_{int}$ | 2.13 ms |
| Scanning rate | 1/T | 6864 Hz |
| Pulse Duration | $T_p$ | 20 ns |
| Echo Duration | $T_{echo}$ | 8.8 μs |
| Clock | $1/T_s$ | 97 kHz |
| Strip Width | S | 98 km |

In view of a potential realization of the concept discussed here, further additional parameters were calculated. The synthetic aperture radar with conical lobe pivoting requires that the 37 GHz antenna can be electronically pivoted in two main planes, and it is assumed that the geometric dimensions are about 7.5 m×2.4 m. The raw radar signals as received on board are digitalized in a two-bit scheme, which leads to a data rate of about 200 MB/s. The required transmission power was calculated with a conservative estimation of transmission losses. Previously, we had determined a signal to noise level of about 5 dB within the individual cells, and an average back scatter coefficient of sigma= −10 dB was assumed. In such case one needs only a transmission power over 20 watts.

Figure 8:
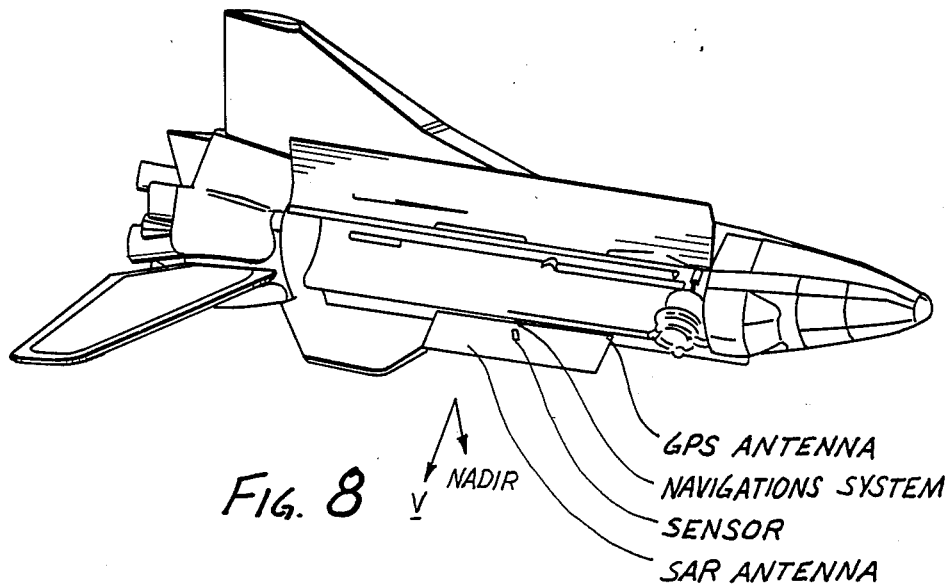
FIG. 8 is a view showing the radar antenna on the space shuttle.

The antenna itself can be mounted on a fixed platform which fits adequately in the cargo space of the space shuttle. As shown in FIG. 8, turning of the space shuttle around its longitudinal axes, will place the radar equipment into a measuring position. The backside of the antenna may be provided with sensors for extremely accurate determination of position. It should be considered that the data evaluation on ground requires that the time dependent state vector of the radar antenna has to be reconstructed. This, in turn, requires accuracy in the meter and arch second ranges. The state vector is a composite of position and speed vectors of and within the phase center, also included are directional vectors, as far as the antenna's main axes are concerned, and the reference time. A suitable measuring system is, for example, given by the GPS-Interferometer, as described in "Chances of the GPS-Satellite Navigation for the Areal Photography" by P. Hartl, A. Wehr, in "Bildmessung und Luftbildwesen", 6/86, in conjunction with star sensors and enertia navigation.

This proposed method promises a number of advantages which flow from the constant angle and transit time within an areal strip, and as compared with conventional side view radar. The favorable system properties are directly shown and demonstrated in the example above, which, of course, includes the utilization of the system and method in conjunction with the space vehicles, e.g. the space shuttle.

The invention is not limited to the embodiments described above, but all changes and modifications thereof not constituting departures from the spirit and scope of the invention are intended to be included.

What is claimed is:

1. Method for topographic mapping at least portions of the surface of the earth under utilization of altitude measurement by means of radar having a synthetic aperture using an electronically controlled antenna lobe, comprising the steps of:
    pivoting the antenna lobe in a conical pattern around the nadir by means of orthogonal phase control;
    maintaining the total transit time of a radar pulse for search and echo path constant; and
    determining the average altitude within a resolution cell, established by and through the center of gravity of the echo power profile.

2. Method as in claim 1, and including the step of mapping in strips of equal width, whereby within the strip further resolution in resolution cells obtains through particular dimensions.

3. Method as in claim 2, said resolution being determined in a direction of flight through using the doppler effect.

4. Method as in claim 2, the resolution transverse to the direction of flight is obtained through the antenna lobe and its aperture.

5. Method as in claim 1, including scanning through electronic lobe pivoting by means of a phase-controlled group transmission.

6. Method as in claim 1, and including two separate lobes for receiving and transmitting, there being alternating switch-over between them.

7. Method as in claim 1, said received echo signals being demixed, scanned, and digitalized for further processing.

* * * * *